(12) United States Patent
Amacker

(10) Patent No.: US 11,202,545 B2
(45) Date of Patent: Dec. 21, 2021

(54) LIFTING ROBOT DEVICES, SYSTEMS, AND METHODS

(71) Applicant: Toyota Research Institute, Inc., Los Altos, CA (US)

(72) Inventor: Matthew Amacker, Santa Clara, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 446 days.

(21) Appl. No.: 16/151,594

(22) Filed: Oct. 4, 2018

(65) Prior Publication Data

US 2020/0107690 A1   Apr. 9, 2020

(51) Int. Cl.
| | |
|---|---|
| *A47L 11/24* | (2006.01) |
| *A47L 11/40* | (2006.01) |
| *B25J 15/02* | (2006.01) |
| *B25J 19/02* | (2006.01) |
| *B25J 5/00* | (2006.01) |
| *B25J 11/00* | (2006.01) |

(52) U.S. Cl.
CPC .......... *A47L 11/24* (2013.01); *A47L 11/4011* (2013.01); *B25J 5/005* (2013.01); *B25J 15/0206* (2013.01); *B25J 19/023* (2013.01); *B25J 11/0085* (2013.01)

(58) Field of Classification Search
CPC combination set(s) only.
See application file for complete search history.

(56) References Cited

U.S. PATENT DOCUMENTS

| | | | |
|---|---|---|---|
| 9,573,638 B2 | 2/2017 | Won | |
| 9,788,698 B2 * | 10/2017 | Morin | A47L 9/106 |
| 2008/0063400 A1 * | 3/2008 | Hudson | G05D 1/0033 |
| | | | 398/106 |
| 2009/0281661 A1 * | 11/2009 | Dooley | B60L 50/52 |
| | | | 700/258 |
| 2011/0268548 A1 | 11/2011 | Doll | |

(Continued)

FOREIGN PATENT DOCUMENTS

| | | |
|---|---|---|
| CN | 101837588 A | 9/2010 |
| CN | 105030164 A | 11/2015 |
| KR | 20100018120 A * | 2/2010 |

OTHER PUBLICATIONS

"Firestorm—Series 3 All Fights—Robot Wars—1999". YouTube Video. Oct. 6, 2017. https://www.youtube.com/watch?v=uCj7EUiEBMY (Year: 2017).*

(Continued)

*Primary Examiner* — Jeff A Burke
*Assistant Examiner* — Madison B Emmett
(74) *Attorney, Agent, or Firm* — Dinsmore & Shohl LLP

(57) ABSTRACT

A robotic device that includes a housing defined by a proximal end and a distal end, the housing including a top planar surface, a bottom planar surface, and a sidewall extending between the top planar surface and the bottom planar surface. The housing further includes an angled surface extending distally from the proximal end between the bottom planar surface and the top planar surface such that the angled surface forms a wedged nose at the proximal end along the bottom planar surface. A conveyor track is positioned along the angled surface and transports articles positioned thereon from the proximal end along the bottom planar surface toward the distal end along the top planar surface.

18 Claims, 9 Drawing Sheets

(56) References Cited

U.S. PATENT DOCUMENTS

| | | | | |
|---|---|---|---|---|
| 2012/0309261 A1* | 12/2012 | Boman | ............... | A63H 30/04 |
| | | | | 446/268 |
| 2016/0174459 A1* | 6/2016 | Balutis | ............... | G05D 1/0234 |
| | | | | 701/25 |
| 2017/0196429 A1* | 7/2017 | Brown | ............... | A47L 9/28 |
| 2017/0286916 A1* | 10/2017 | Skiba | ............... | H04L 67/42 |
| 2019/0167059 A1* | 6/2019 | Brown | ............... | A47L 9/2805 |

OTHER PUBLICATIONS

"Robot Wars Wiki: Anorakaphobia". Website article. 2009. https://robotwars.fandom.com/wiki/Anorakaphobia (Year: 2009).*

"Robot Wars Wiki: Anorakaphobia". Website article. 2009. https://robotwars.fandom.com/wiki/Anorakaphobia?oldid=246722 (Year: 2009).*

"Accumulators"; https://curriculum.vexrobotics.com/curriculum/objectmanipulation/accumulators.html, Accessed/Published Date: Jun. 20, 2018.

* cited by examiner

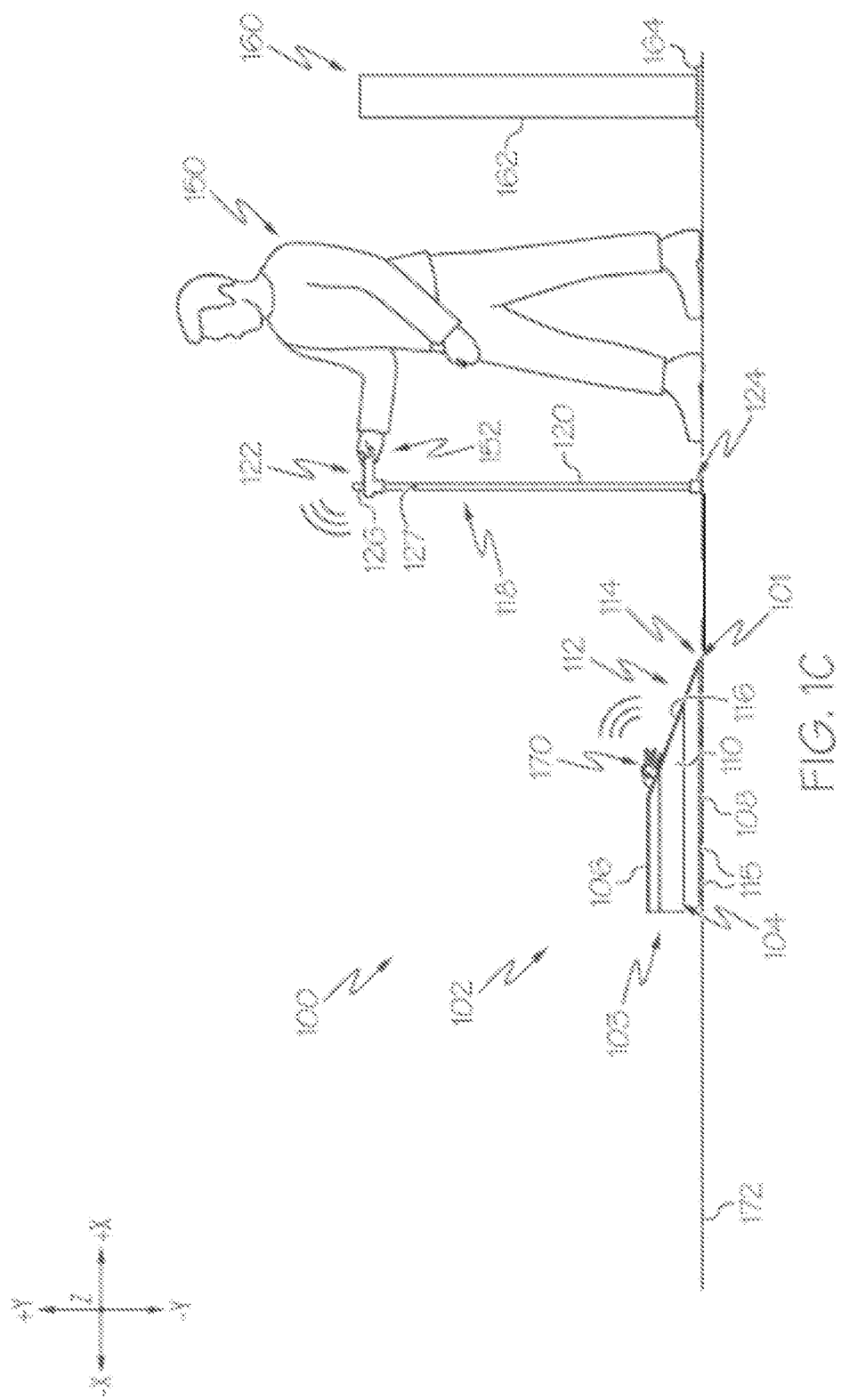

LIFTING ROBOT DEVICES, SYSTEMS, AND METHODS

TECHNICAL FIELD

The present specification generally relates to assistive robot systems and, more particularly, to low-profile robot systems capable of navigating through terrains to lift objects off a ground surface to a level that is reachable by a user.

BACKGROUND

Currently, certain people may struggle with retrieving items. For example, people such as elderly or people with reduced mobility may struggle with the movements necessary to pick items off a ground or floor surface, such as, for example, items that have been dropped.

Existing devices and robot systems may include large profiles and/or obtrusive shapes that inhibit the ability of a robot system in easily maneuvering about a terrain, such as a residential room. Other devices may further include arms with an actuator, such as a gripper or the like, that are required to be manually operated by a user to retrieve an item. Since, such devices are not autonomous, they may still present difficulties to the user in lifting the item off of the ground or floor surface.

SUMMARY

In one embodiment, a robotic vehicle includes a housing defined by a proximal end and a distal end, the housing including a top planar surface, a bottom planar surface, and a sidewall extending between the top planar surface and the bottom planar surface, the housing further including an angled surface extending distally from the proximal end between the bottom planar surface and the top planar surface such that the angled surface forms a wedged nose at the proximal end along the bottom planar surface; and a conveyor track positioned along the angled surface such that the conveyor track transports articles positioned thereon from the proximal end along the bottom planer surface toward the distal end along the top planar surface.

In another embodiment, a remote controlled robotic system includes a robotic vehicle, comprising a housing having a proximal end and a distal end, the housing is defined by a top surface, a bottom surface, a sidewall, and an angled surface, wherein the top surface extends parallel to the bottom surface and the sidewall extends between the top and bottom surfaces, wherein the angled surface extends transversely relative to the top and bottom surface and forms a wedged nose at a juncture of the angled surface and the bottom surface along the proximal end; a conveyor track positioned along the angled surface that translates from the proximal end at juncture of the bottom and angled surfaces to the top surface such that articles positioned thereon are translated along the angled surface toward the top surface; and a processor disposed within the housing; a cane, comprising a transponder communicatively coupled to the processor of the robotic vehicle such that the cane transmits commands to the robotic vehicle.

In yet another embodiment, a method for operating a robotic device includes positioning a cane apparatus adjacent to a target object, the cane apparatus providing stability for walking; navigating the robotic device to the cane apparatus such that the robotic device approaches the target object; engaging the target object with a wedged nose of the robotic device; and actuating a conveyor track of the robotic device to pull the target object up over the wedged nose and onto a top surface of the robotic device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 1C schematically depicts a side view of an illustrative lifting robot device transporting a target object along a conveyor track of the robot device according to one or more embodiments shown and described herein;

DETAILED DESCRIPTION

Figure 1A:
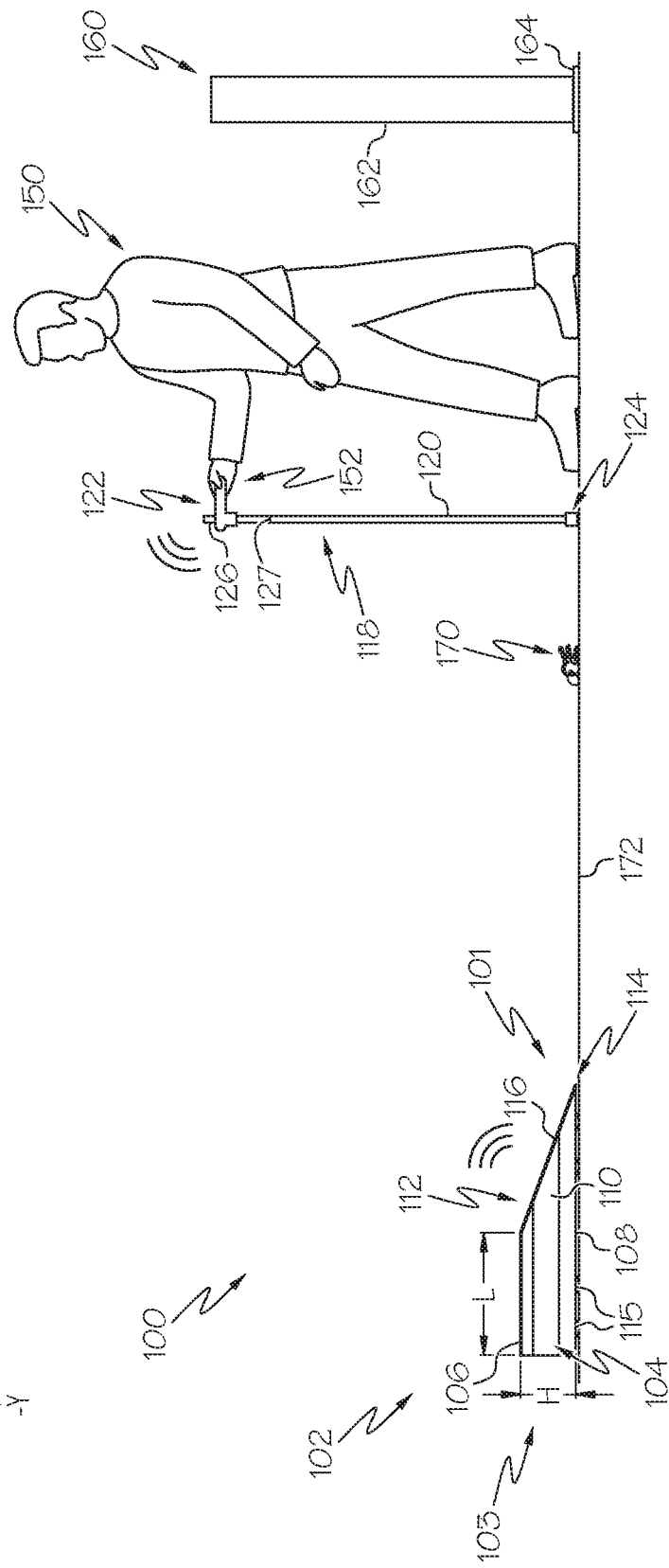
FIG. 1A schematically depicts a side view of an illustrative lifting robot device interacting with a cane apparatus operated by a user according to one or more embodiments shown and described herein.

The present disclosure relates generally to robot systems that assist a user in retrieving target objects or articles from a surface that is lower than the user is able to easily access (e.g., a ground or floor surface). The robot systems are particularly useful for users that struggle with picking up target objects off the ground or floor on their own, such as, for example, elderly individuals or individuals with reduced mobility. The robot systems described herein generally include components for collecting the target object from a relatively lower height (e.g., the floor or ground surface) and elevating the target object to a relatively higher height (e.g., a height that is more easily reachable by a user). In some embodiments, the robot systems described herein may further deliver the target object to the user. In some embodiments, the robot systems described herein may further include an identifying device that is held by a user and used to indicate the target object to be lifted off the floor or ground. For example, the user may hold an identifying device in the form of a cane apparatus that may be generally utilized to aid the user in supporting their balance while walking, indicating the target object to be lifted off the floor or ground, and/or manipulating a robot device. The present disclosure further relates to robot systems that incorporate a generally low-profile system that occupies a minimal space to facilitate the robot system's ability to maneuver in various terrains and environments, including for example, a residential home.

The heights described herein are non-limiting, and may vary based on the abilities of a user, the height of a user, the location of a target object, and/or the like. As such, it should be understood that a "user reachable height," a "height that is accessible to a person," or other similar term refers to a height that a particular user can access based on that user's abilities and body height. For example, a user that is wheelchair bound may have a user reachable height that generally corresponds to the height of the user's arms and hands when sitting in the wheelchair.

Referring to FIG. 1, an illustrative lifting robot system 100 that may provide particular use in assisting people, particularly those who are elderly and/or have reduced mobility (referred to herein as a user 150), is shown according to various embodiments. A target object 170 is positioned along a terrain 172 at a first height (e.g., a height of the ground along the terrain 172) that is substantially below a second height that is accessible to a user 150. It should be appreciated that the lifting robot system 100 is not limited to this use and may be used for other purposes without departing from the scope of the present disclosure. For example, the lifting robot system 100 may be used to deliver target objects 170 from a user 150 to a target location (e.g., raise or lower target objects 170 collected from a user 150). In some embodiments, the lifting robot system 100 may be used in other fields, such as, for example, in healthcare, in manufacturing, in vehicle repair, and/or the like.

The lifting robot system 100 generally includes a robotic device 102 that is communicatively coupled to a cane apparatus 118. As will be described in greater detail below, the cane apparatus 118 serves as a remote device for a user 150, such that the user 150 may transmit commands to the robotic device 102 via the cane apparatus 118. In some embodiments, the cane apparatus 118 may releasably engage the robotic device 102 at a receiver positioned along the robotic device 102, as described in greater detail herein. The robotic device 102 includes a housing 104 that is defined by a top surface 106, a bottom surface 108 positioned relatively below the top surface 106, one or more sidewalls 110 extending between the top surface 106 and the bottom surface 108, and an angled surface 112. Top surface 106 extends parallel relative to bottom surface 108 and top and bottom surfaces 106, 108 define planar surfaces. The housing 104 defines a low profile such that the top surface 106 and the bottom surface 108 have a length L extending along a system horizontal direction (i.e., along the +X/−X axis of the coordinate axes of FIGS. 1A-1C) that is greater than a height H of the one or more sidewalls 110 extending along a system vertical direction (i.e. along the +Y/−Y axis of the coordinate axes of FIGS. 1A-1C).

In particular, the bottom surface 108 includes a greater length along the system horizontal direction than the top surface 106 such that the bottom surface 108 extends horizontally further than the top surface 106 relative to the system horizontal direction. The angled surface 112 of the housing 104 extends between the top surface 106 and the bottom surface 108 at an angle due to the varying lengths of the top and bottom surfaces 106, 108. Accordingly, the angled surface 112 is oriented transversely relative to the longitudinal lengths of the top and bottom surfaces 106, 108. In other words, the angled surface 112 is angled to interconnect the top surface 106 with to the bottom surface 108 along a portion of the housing 104 where the bottom surface 108 extends horizontally further than the top surface 106 relative to the system horizontal direction.

Figure 1B:
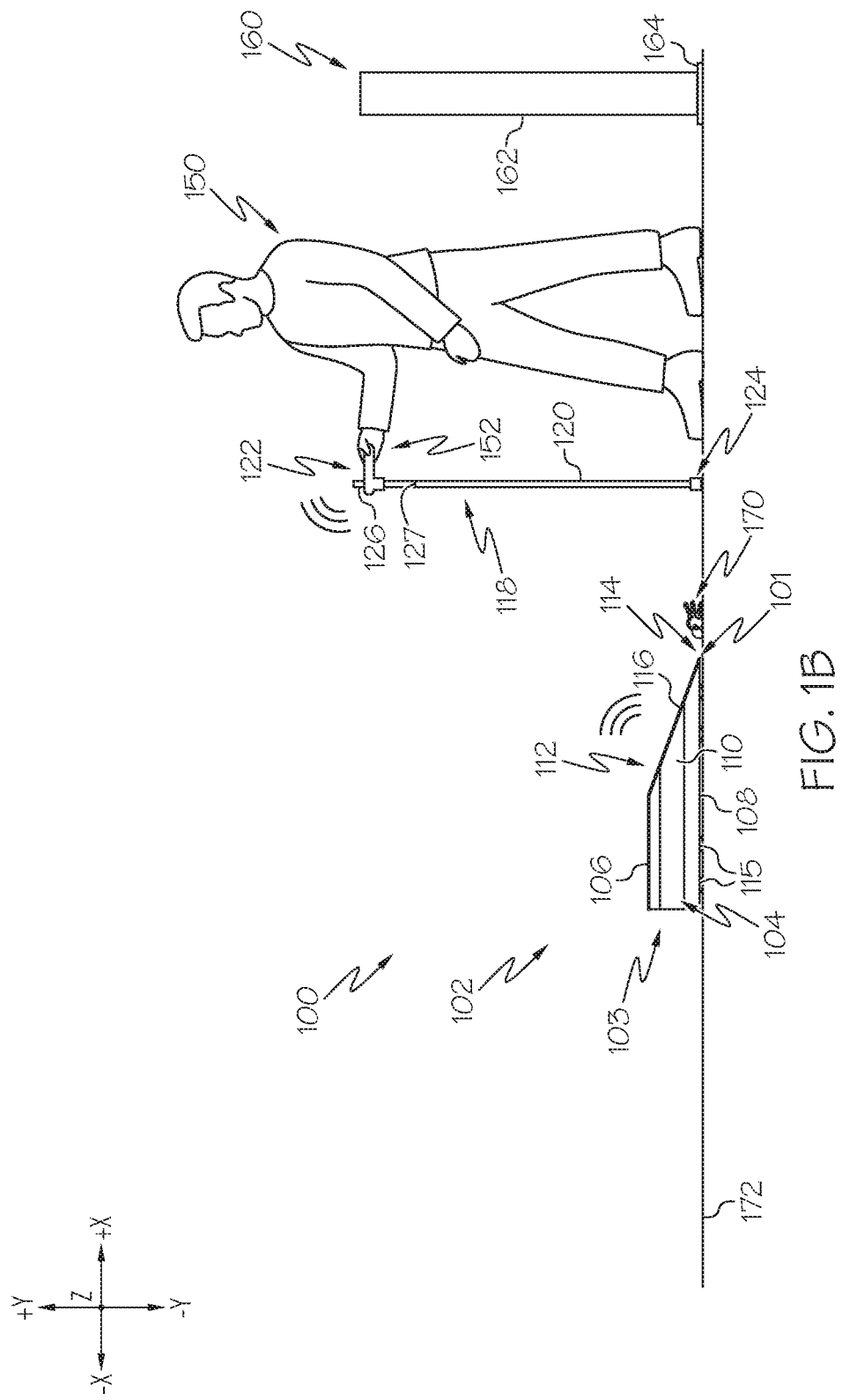
FIG. 1B schematically depicts a side view of an illustrative lifting robot device positioned at a location of a target object according to one or more embodiments shown and described herein.

Angled surface 112 defines a planar surface that includes a lifting component (i.e. a conveyor track 116) positioned thereon, as will be described in greater detail below. Housing 104 further includes a wedged nose 114 along a proximal end 101 that defines a juncture point between angled surface 112 and bottom surface 108. The wedged nose 114 extends along a perimeter of the proximal end 101 where the angled surface 112 intersects with the bottom surface 108 to define a plow-shaped component at the wedged nose 114. As will be described in greater detail below, wedged nose 114 is shaped and sized to contact a ground surface of terrain 172 as robotic device 102 moves across a terrain 172 to receive a target object 170 onto a lifting component of the robotic device 102 and thereby allow the lifting component to transfer the target object 170 toward a distal end 103 of the housing 104. The wedged nose 114 at the proximal end 101 is shaped to scrape the surface and may be beveled or sloping such that the target object 170 can be slidably received over the wedged nose 114 and onto the lifting component, as will be described in further detail below and as shown in FIG. 1B. It should be understood that the shapes, sizes, and characteristics of the wedged nose 114 at the proximal end 101 may be similar to that of a dustpan. Other features and/or characteristics of the wedged nose 114 are not limited by the present disclosure. The various surfaces 106, 108, 110, 112 of housing 104 support one or more components of the robotic device 102, as described in greater detail herein.

Bottom surface 108 of housing 104 may include one or more mobility components thereon, such as, for example, one or more wheels 115 rotatably coupled to bottom surface 108 of housing 104 for navigating the robotic device 102 across a terrain 172. In some embodiments, at least one of the one or more wheels 115 may be coupled to a drive mechanism such as a motor, a transmission, and/or the like such that the wheels 115 can be rotated to move the robotic device 102 across the terrain 172. In some embodiments, at least one of the wheels 115 may be movable around a plurality of axes such that the wheel is steerable. The wheels 115 are otherwise not limited by the present disclosure and may contain any other features. For example, the wheels 115 may be adapted for moving over varied, stepped, irregular, natural, paved, and/or unpaved terrains 172, adapted for navigating the robotic device 102 over various terrain obstructions (such as a single step, a carpet, a rug, an object, hardwood, a rock/stone, grass, and/or other various items defining a threshold), adapted to move in inclement weather conditions, and/or the like. While FIGS. 1A-1C depict wheels 115 as the mobility components, it should be appreciated that the present disclosure is not limited to such. For example, the mobility components may be skis, rotors, continuous tracks, and/or the like that provide the robotic device 102 with an ability to move across the terrain 172.

In various embodiments, the robotic device 102 may include a lifting component coupled to the housing 104 (e.g., coupled to a surface 106, 108, 110, 112 of housing 104). In the present example, the lifting component includes a conveyor track 116 coupled to and positioned along housing 104. In some embodiments, the conveyor track 116 may be movably coupled to the housing 104 of robotic device 102 such that the conveyor track 116 can move in a system horizontal direction (e.g., along the +X/−X axis of the coordinate axes of FIGS. 1A-1C), as described in greater detail below. However, it should be understood that in some embodiments, the conveyor track 116 may be movably coupled to the housing 104 in other manners so as to facilitate the conveyor track 116 moving in various other system directions. In the present example, conveyor track 116 is positioned along the angled surface 112 and top surface 106 of housing 104, as best seen in FIG. 2.

Figure 2:
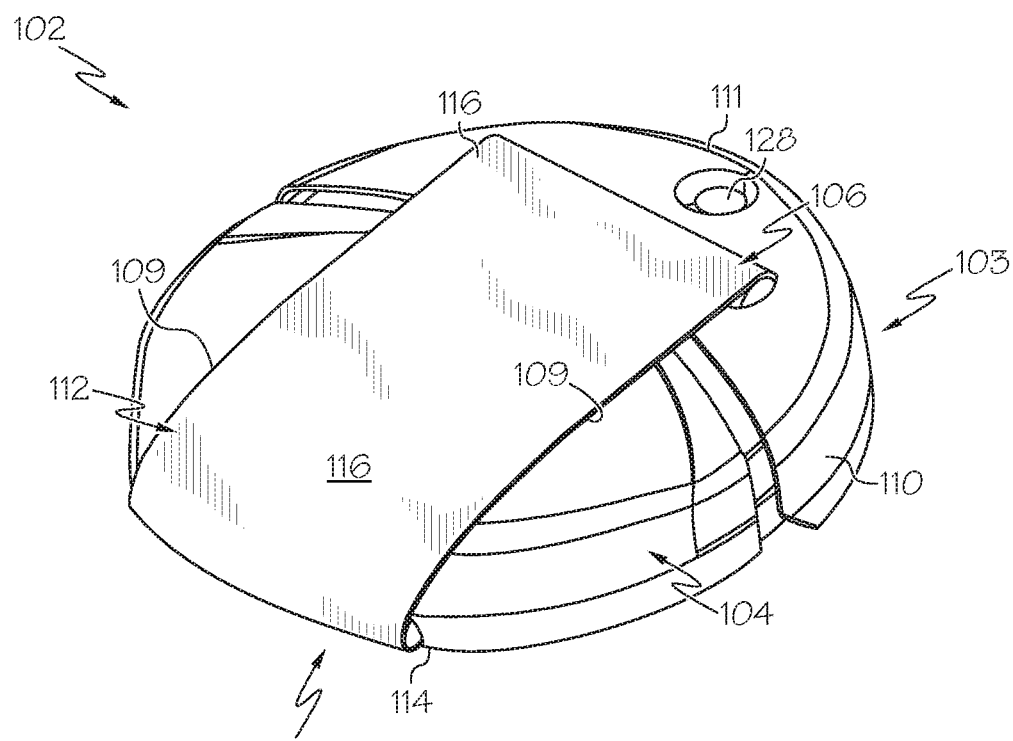
FIG. 2 depicts a perspective view of a lifting robot device according to one or more embodiments shown and described herein.

Referring to FIG. 2, the conveyor track 116 may be coupled to a belt drive mechanism, chain drive mechanism, linear drive motor, or other various control hardware disposed within housing 104 that may drive movement of the conveyor track 116 along the angled surface 112 and top surface 106. In particular, the conveyor track 116 may translate upward across angled surface 112, toward top surface 106, and across the planar surface of top surface 106 toward the distal end 103. Additionally, the conveyor track 116 may translate in an opposite direction that than described above, such that the conveyor track 116 translates across the planar surface of top surface 106 toward the angled surface 112 and downward across the angled surface 112 toward the wedged nose 114 at the proximal end 101. Although not shown, it should be understood that conveyor track 116 may be positioned along various other surfaces 106, 108, 110, 112 of housing 104.

Conveyor track 116 may generally function to raise or lower a target object 170 between a first height and a second height. For example, conveyor track 116 may raise or lower a target object 170 between a ground or floor surface, such as terrain 172, to a height above the ground or floor surface, such as the planar surface of top surface 106. It should be understood that the ground or floor surface and the height to which the conveyor track 116 may lift a target object 170 are merely illustrative and that conveyor track 116 may also move target objects 170 between other heights not specifically described herein. In the present example, conveyor track 116 may transfer a target object 170 positioned atop angled surface 112 and/or top surface 106 in either direction of the system horizontal direction.

It should be understood that, in some embodiments, housing 104 may further include one or more edges extending along at least the angled surface 112 and/or the top surface 106 to prevent the target object 170 from falling off of the angled surface 112 and top surface 106. For example, as seen in FIG. 2, housing 104 may include a pair of side edges 109 positioned along angled surface 112 and/or top surface 106 that extend or protrude in a substantially vertical direction relative to the planar surfaces of surfaces 106, 112. Housing 104 may also include a rear edge 111 that is shaped and/or sized to retain the target object 170 on the top surface 106 such that the rear edge 111 inhibits the conveyor track 116 from transferring the target object 170 off of the top surface 106 at the distal end 103 of the robotic device 102.

The robotic device 102 may include various components that allow the robotic device 102 to have autonomous movement and/or semi-autonomous movement capabilities that allow the robotic device 102 to move around a space with little or no input from a user 150, such as, for example, via an identifying device as will be described in greater detail below. That is, the robotic device 102 may include components such as autonomous drive systems, autonomous sensing devices, and/or the like.

Referring again to FIGS. 1A-1C, the lifting robot system 100 further includes an identifying device in the form of a cane apparatus 118 that is communicatively coupled to robotic device 102 via a wireless network. Cane apparatus 118 may be held by a user 150 and used to provide robotic device 102, among other user inputs, with an indication of a location of the target object 170 to be lifted from the terrain 172, and/or physically manipulating the robotic device 102 as will be described in greater detail below. Cane apparatus 118 may be portable such that it can be held by a hand 152 of a user 150. Cane apparatus 118 includes an elongated shaft 120 extending between a handle end 122 and a tip end 124. The elongated shaft 120 is generally sized in accordance with a height of a user 150 such that the handle end 122 is positioned at a height relatively adjacent to the hand 152 of the user 150 when the tip end 124 is positioned against the terrain 172. In addition to being used to provide robotic device 102 with user inputs and/or physically manipulating the robotic device 102, the cane apparatus 118 serves as a physical support device for the user 150 that is graspable by a hand 152 of user 150 at the handle end 122 to provide stability and balance when the tip end 124 is engaged against the terrain 172. It should be understood that the cane apparatus 118 described herein is merely illustrative, and other configurations and/or components of the identifying device may also be used without departing from the scope of the present disclosure.

Cane apparatus 118 may generally provide one or more user-facing functions, including, but not limited to, providing the user 150 with controls for indicating a location of a target object 170 to be lifted, providing the user 150 with controls for controlling movement of the robotic device 102, providing the user 150 with controls for controlling settings of the lifting robot system 100, providing the user 150 with controls for docking the robotic device 102 to a charging station, providing the user 150 with controls for directing the conveyor track 116 to move up or down, and/or the like. It should be understood that the cane apparatus 118 may provide other functionality not specifically described herein without departing from the scope of the present disclosure.

In some embodiments, the cane apparatus 118 may include one or more user input components, including, but not limited to, one or more actuation features, one or more buttons, one or more microphones, one or more motion sensors (e.g., gyro sensors or the like), one or more imaging devices, and/or the like. Such components may generally be used to receive one or more inputs from the user 150 in the form of a button press, a voiced command, a movement or gesture while holding the cane apparatus 118, a gesture that is imaged by the cane apparatus 118, and/or the like. In the present example, the cane apparatus 118 may include an activation feature in the form of a button 126 along the handle end 122. As will be described in greater detail below, actuation of the button 126 may transmit a location of the cane apparatus 118 to the robotic device 102. In some embodiments, the cane apparatus 118 may include one or more light emitting components 127 that emit an indicator, such as a laser, as described in greater detail herein. The light emitting component 127 may be positioned along the elongated shaft 120, the handle end 122, and/or the tip end 124 of the cane apparatus 118. In some embodiments, the cane apparatus 118 may have particular components that provide functionality for uses other than locating the target object 170. For example, the cane apparatus 118 may have components (e.g., joystick components) that allow the user 150 to manually control movement of the robotic device 102 and/or a component thereof. As such, the user 150 may manually drive the robotic device 102 to the target object 170 and/or direct collection and hoisting of the target object 170 by manipulating a component of the cane apparatus 118, as described herein.

The cane apparatus 118 may be communicatively coupled to the robotic device 102 such that one or more signals can be transmitted from the cane apparatus 118, in possession of the user 150, to the robotic device 102. That is, the cane apparatus 118 may be communicatively coupled to various components of the robotic device 102 via a wireless connection, such as, for example, a Bluetooth connection, a wi-fi connection, a mesh network connection (e.g., a Zigbee connection, a Z-wave connection, and/or the like), a near field communication (NFC) connection, and/or the like. As such, the cane apparatus 118 and the various components of the robotic device 102 may each have hardware components that allow for such a wireless coupling. Additional details regarding such components are described in greater detail herein.

Figure 3:
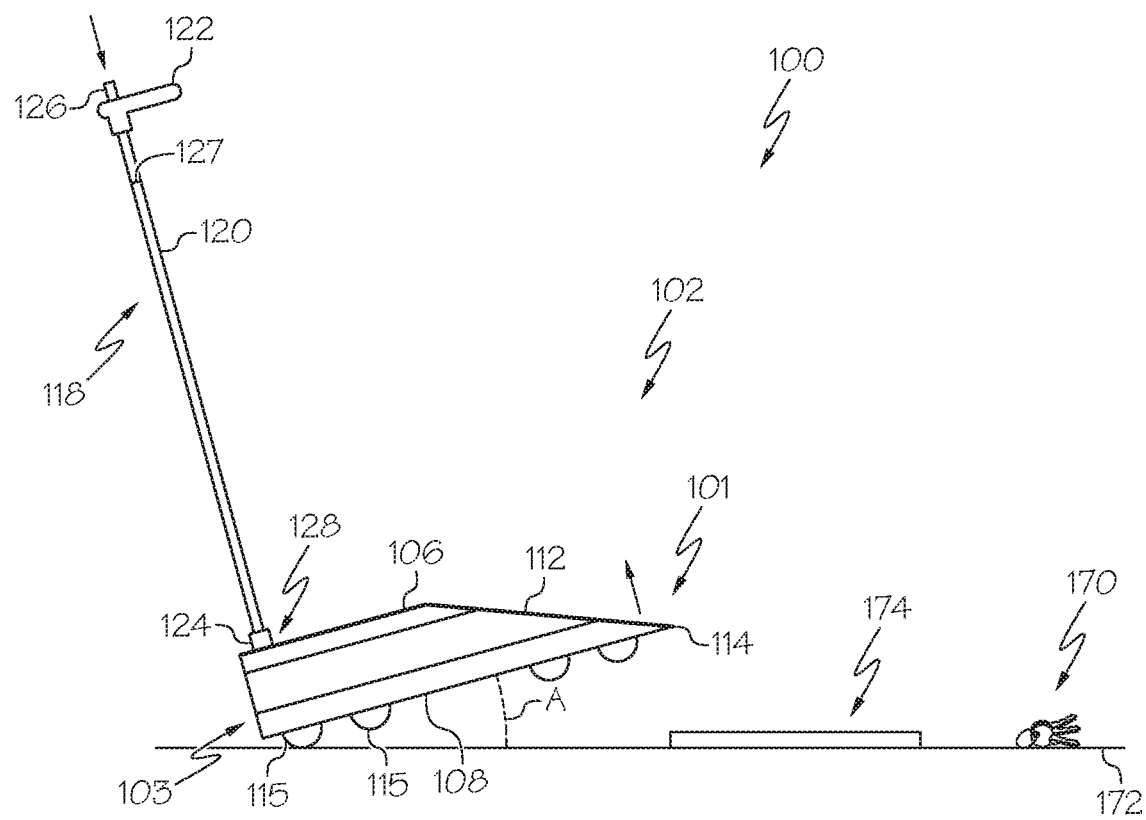
FIG. 3 schematically depicts a side view of a cane apparatus coupled to a lifting robot device to maneuver the lifting robot device about an obstruction present along a terrain according to one or more embodiments shown and described herein.

Referring back to FIG. 2, the robotic device 102 may include a receiver 128 positioned along the top surface 106 of housing 104 at the distal end 103. Receiver 128 is sized and shaped to receive the tip end 124 of the cane apparatus 118 such that the cane apparatus 118 may be releasably coupled to the robotic device 102 by inserting the tip end 124 into the receiver 128 (FIG. 3). The cane apparatus 118, when physically manipulated by the user 150, may tilt, align, move, rotate, pivot and/or maneuver the robotic device 102 relative to terrain 172 when the tip end 124 is coupled to the receiver 128. For example, the cane apparatus 118 becomes hingedly coupled to the robotic device 102 via the engagement of the tip end 124 and the receiver 128 such that the cane apparatus 118 may pivot the robotic device 102 about the distal end 103 by applying a downward force onto the handle end 122, thereby transferring the force onto the distal end 103 of housing 104. Referring to FIG. 3, the cane apparatus 118, when physically manipulated by the user 150, may lift the wedged nose 114 of the robotic device 102 to avoid an obstruction 174 located along the terrain 172 as robotic device 102 travels toward a location of the target object 170. It should be understood that the receiver 128 may be positioned along various other surfaces of the housing 104, such as, for example, the one or more sidewalls 110.

In some embodiments, the target object 170 may be collected and/or moved by one component (i.e. the robotic device 102) and lifted by another, separate component instead of using the same component for collecting, moving, and lifting (i.e. the robotic device 102). For example, the lifting robot system 100 may include the robotic device 102 and a second unit 160 that is separate from the robotic device 102 for lifting the target object 170 toward a second height proximate to a hand 152 of a user 150. In this instance, the robotic device 102, as described above, may generally contain components for locating, collecting, and moving the target object 170 about the terrain 172. The second unit 160 may be referred to as an elevator lift, a dumbwaiter, or the like, and may generally contain components for lifting the target object 170 once the target object 170 has been retrieved and delivered from the terrain 172 by the robotic device 102.

In particular, the second unit 160 is generally stationary such that the second unit 160 is not movable around the terrain 172. The second unit 160 may include a lifting component 162 coupled to a lifting pad 164 and only functions to raise and lower the lifting pad 164 relative to a first height at the terrain 172 and a second height that is accessible to a user 150, such as a height corresponding to the position of a hand 152 of a user 150. It should be understood that the ground or floor surface and the particular height are merely illustrative, and the lifting component 162 can also move the lifting pad 164 between other heights not specifically described herein. The lifting component 162 may include a mechanism that adjusts the height of the lifting component 162 and the lifting pad 164 coupled thereto. Such a mechanism generally provides the second unit 160 with an ability to lift objects off the ground or floor surface. The lifting component 162 may automatically drive the lifting pad 164 in an upwards or downwards motion in a system vertical direction (i.e., along the y axis of the coordinate axes of FIG. 1A-1C) to lift the lifting pad 164 off the ground surface or place the lifting pad 164 on the ground surface of terrain 172. In addition, the lifting component 162 may further be any device or mechanism that is capable of supporting the weight of the lifting pad 164 and any item held thereon, such as the target object 170. Accordingly, the lifting component 162 may include, but is not limited to, a chain drive mechanism, a belt drive mechanism, a hydraulic lift, a pneumatic lift, a linear drive motor, a lead screw, a plurality of mechanical linkages (e.g., a scissor lift mechanism), a ribbon lift (i.e., a zip lift), a spiral lift, and/or the like. Other means of driving the movement of the lifting component 162 as described herein are contemplated and included within the scope of the present disclosure.

The lifting pad 164 is generally not limited by this disclosure, and may be any surface that supports an object when placed thereon such that the lifting component 162 can lift the lifting pad 164. In some embodiments, the lifting pad 164 may be coupled to one or more sensors, such as imaging devices, pressure sensors, and/or the like that are used to determine whether an object is located on the lifting pad 164. In some embodiments, the second unit 160 may be communicatively coupled to the robotic device 102 and/or the cane apparatus 118 such that the second unit 160 may receive signals from either the robotic device 102 and/or the cane apparatus 118 to raise or lower the lifting component 162 and the lifting pad 164, respectively.

Figure 4:
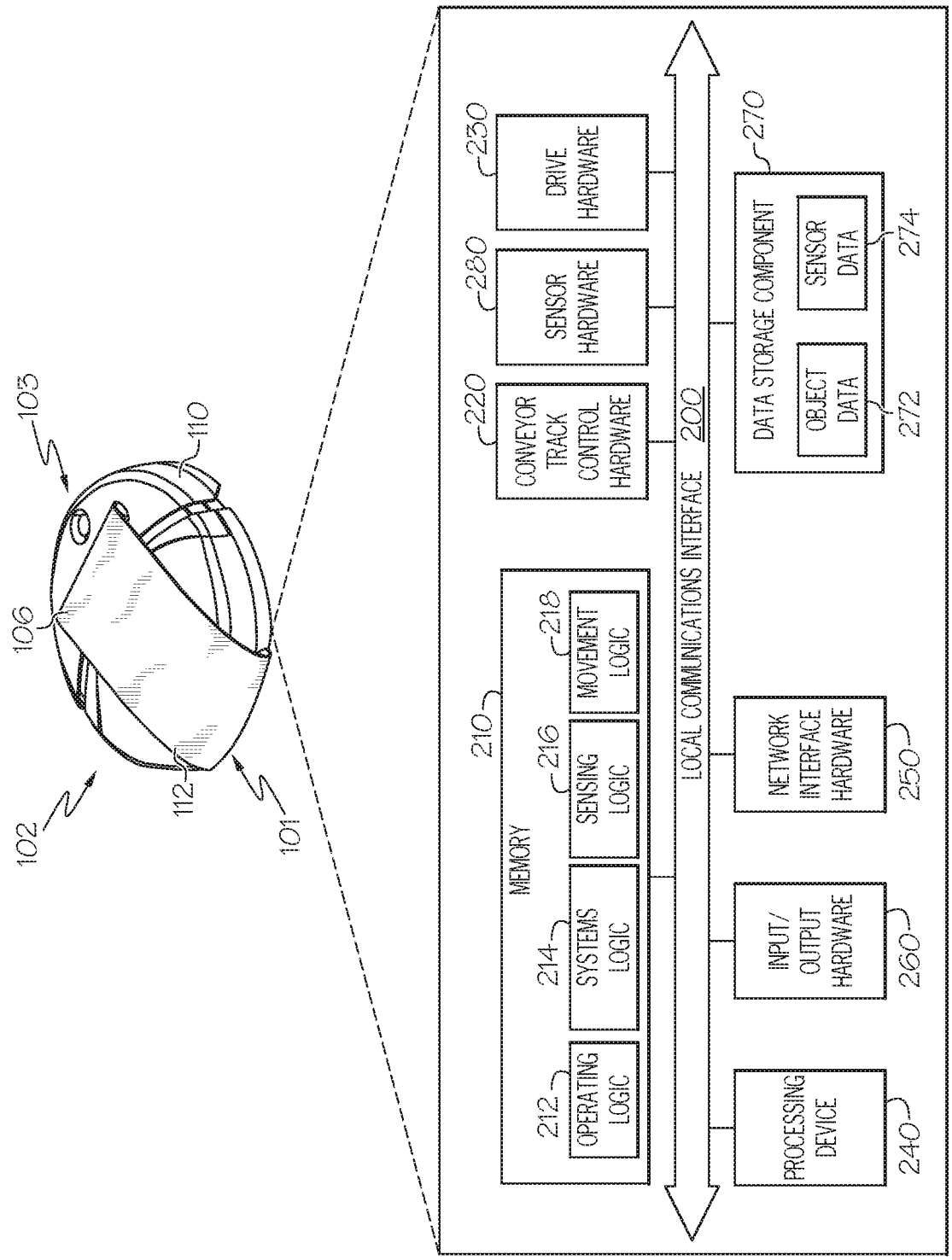
FIG. 4 schematically depicts illustrative hardware components of a lifting robot device according to one or more embodiments shown and described herein.

Referring to FIG. 4, the robotic device 102 of the lifting robot system 100 may include a non-transitory memory component 210, conveyor track control hardware 220, drive hardware 230, a processing device 240, a network interface hardware 250, and an input/output (I/O) hardware 260. A local interface 200, such as a bus or the like, may interconnect the various components. The processing device 240, such as a computer processing unit (CPU), may be the central processing unit of the robotic device 102, performing calculations and logic operations to execute a program. The processing device 240, alone or in conjunction with the other components, is an illustrative processing device, computing device, processor, or combination thereof. The processing device 240 may include any processing component configured to receive and execute instructions (such as from the memory component 210).

The memory component 210 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 210 may include one or more programming instructions thereon that, when executed by the processing device 240, cause the processing device 240 to complete various processes, such as the processes described herein with respect to FIGS. 6-8.

Still referring to FIG. 4, the programming instructions stored on the memory component 210 may be embodied as a plurality of software logic modules, where each logic module provides programming instructions for completing one or more tasks. Illustrative logic modules depicted in FIG. 4 include, but are not limited to, operating logic 212, systems logic 214, a sensing logic 216, and/or movement logic 218. Each of the logic modules shown in FIG. 4 may be embodied as a computer program, firmware, or hardware, as an example. The operating logic 212 may include an operating system and/or other software for managing components of the robotic device 102. The systems logic 214 may generally include logic for operating components of the lifting robot system 100, such as, for example, facilitating communication between various components of the lifting robot system 100 (e.g., communications between the cane apparatus 118 and the robotic device 102 (FIGS. 1A-1C)). Still referring to FIG. 4, the sensing logic 216 may include one or more programming instructions for sensing the cane apparatus 118, determining a location of the cane apparatus 118 relative to the robotic device 102, sensing an indicator provided by the cane apparatus 118, determining a location of an indicator relative to the robotic device 102 and/or the cane apparatus 118, and/or the like. The movement logic 218 may include one or more programming instructions for moving the robotic device 102 around the terrain 172, moving the robotic device 102 or a component thereof relative to a target object 170, moving various components of the robotic device 102 (e.g., the conveyor track 116, wheels 115, and/or the like).

The conveyor track control hardware 220 generally includes one or more components that control movement of a lifting component coupled to the robotic device 102. For example, the conveyor track control hardware 220 may control the conveyor track 116 that directs movement of a target object 170 received therein toward a second height along the top surface 106 of the robotic device 102 by transmitting signals to the conveyor track 116 to cause the conveyor track to actuate accordingly, as described in greater detail herein.

Still referring to FIG. 4, in some embodiments the sensor hardware 280 may generally include one or more hardware components that are used in the robotic device 102 to aid the robotic device 102 in navigating toward the cane apparatus 118 and/or the target object 170. Illustrative hardware components that may aid the robotic device 102 to navigate toward the cane apparatus 118 may include, but are not limited to, a camera (including video and still cameras), an optical sensor, a ranging system, a time-of-flight (TOF) sensor, a proximity sensor, laser emitting devices and/or sensing devices. Other sensors, particularly those used for the purposes of obtaining information that is used for autonomous robotic movement, are contemplated and included within the scope of the present disclosure. In some embodiments, the sensor hardware 280 may receive sensed information and transmit signals and/or data corresponding to the sensed information to one or more components described herein. For example, the sensor hardware 280 may receive images and/or image data via the cane apparatus 118 and generate one or more signals and/or data to transmit to the processing device 240 for processing the data and determining control of the robotic device 102 for maneuvering the robotic device 102 toward the cane apparatus 118 and/or the target object 170, as described in greater detail herein.

Still referring to FIG. 4, the drive hardware 230 may generally include one or more hardware components that control movement of the robotic device 102. For example, the drive hardware 230 may be used to direct a drive mechanism, one or more drive motors, and/or the like to propel the robotic device 102 around the terrain 172, to direct one or more components (e.g., a drive mechanism, such as wheels 115) of the robotic device 102 to propel the robotic device 102 around the terrain 172, to direct movement of the lifting component (e.g., the conveyor track 116), and/or the like. That is, one or more signals may be transmitted by the drive hardware 230 to a component, thereby causing the component to move or cease moving.

The I/O hardware 260 may communicate information between the local interface 200 and one or more other components of the robotic device 102. For example, the I/O hardware 260 may act as an interface between the cane apparatus 118 and other components of the lifting robot system 100, so as to facilitate communication between the cane apparatus 118 and the various other components of the robotic device 102, as described in greater detail herein. The I/O hardware 260 may be utilized to transmit one or more commands to the other components of the robotic device 102 and/or receive one or more commands and/or data from the components of the cane apparatus 118 in some embodiments.

The network interface hardware 250 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 250 may be used to facilitate communication between smart home components (e.g., sensors, cameras, user interface devices, and/or the like) and the robotic device 102 via a network. That is, the lifting robot system 100 may receive commands from a user, receive sensor data, and/or the like from other devices connected to a user's home network, as described in greater detail herein. The network interface hardware 250 may further be used to facilitate communication between the internal components of the robotic device 102 (FIG. 4) and the internal components of the cane apparatus 118 (FIG. 5).

The data storage component 270, which may generally be a storage medium, may contain one or more data repositories for storing data that is received and/or generated. The data storage component 270 may be any physical storage medium, including, but not limited to, a hard disk drive (HDD), memory, removable storage, and/or the like. While the data storage component 270 is depicted as a local device, it should be understood that the data storage component 270 may be a remote storage device, such as, for example, a server computing device, cloud based storage device, or the like. In some embodiments, illustrative data that may be contained within the data storage component 270 includes, but is not limited to, object data 272, sensor data 274, and/or other data. The object data 272 may generally be data that is used by the lifting robot system 100 to recognize particular target objects. For example, if a user requests that the lifting robot system 100 lift "keys," the lifting robot system 100 may access the object data 272 to obtain a reference image of a set of keys in order to locate the target object 170. The object data 272 may be prepopulated data or may be data that is continuously updated with images around a space such that the lifting robot system 100 utilizes a machine learning algorithm to recognize particular characteristics of a target object 170. The sensor data 274 may generally include data that is obtained from the sensor hardware 280. One nonlimiting example of data contained within the sensor data 274 may include image data relating to an area surrounding the lifting robot system 100, a user 150, and/or a target object 170.

It should be understood that the components illustrated in FIG. 4 are merely illustrative and are not intended to limit the scope of this disclosure. More specifically, while the components in FIG. 4 are illustrated as residing within the robotic device 102, this is a nonlimiting example. In some embodiments, one or more of the components may reside external to the robotic device 102.

Figure 5:
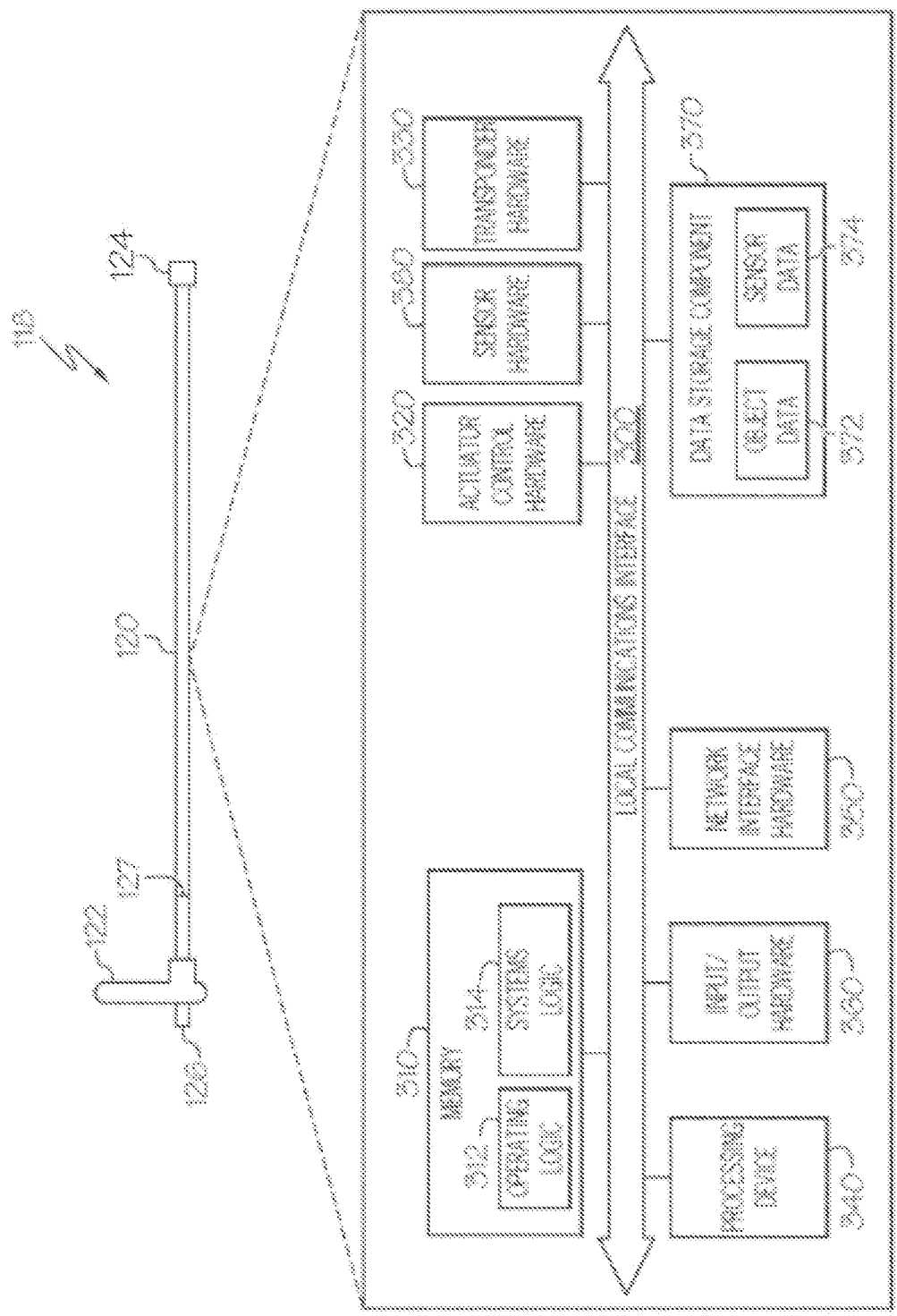
FIG. 5 schematically depicts illustrative hardware components of a cane apparatus according to one or more embodiments shown and described herein.

Referring to FIG. 5, the cane apparatus 118 of the lifting robot system 100 may include a non-transitory memory component 310, an actuator control hardware 320, transponder hardware 330, a processing device 340, a network interface hardware 350, and an input/output (I/O) hardware 360. A local interface 300, such as a bus or the like, may interconnect the various components. The processing device 340, such as a computer processing unit (CPU), may be the central processing unit of the cane apparatus 118, performing calculations and logic operations to execute a program. The processing device 340, alone or in conjunction with the other components, is an illustrative processing device, computing device, processor, or combination thereof. The processing device 340 may include any processing component configured to receive and execute instructions (such as from the memory component 310).

The memory component 310 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 310 may include one or more programming instructions thereon that, when executed by the processing device 340, cause the processing device 340 to complete various processes, such as the processes described herein with respect to FIGS. 6-8.

Still referring to FIG. 5, the programming instructions stored on the memory component 310 may be embodied as a plurality of software logic modules, where each logic module provides programming instructions for completing one or more tasks. Illustrative logic modules depicted in FIG. 3 include, but are not limited to, operating logic 312, and/or a systems logic 314. Each of the logic modules shown in FIG. 5 may be embodied as a computer program, firmware, or hardware, as an example. The operating logic 312 may include an operating system and/or other software for managing components of the cane apparatus 118. The systems logic 214 may generally include logic for operating components of the cane apparatus 118, such as, for example, facilitating communication between various components of the cane apparatus 118 (e.g., communications between the cane apparatus 118 and the robotic device 102 (FIGS. 1A-1C)).

The actuator control hardware 320 generally includes one or more components that control actuation of a transponder 330 coupled to the cane apparatus 118. For example, the actuator control hardware 320 may control the transponder 330 that directs a location of the cane apparatus 118 to the robotic device 102 by transmitting signals to via the network interface hardware 350 of the cane apparatus 118 to cause the robotic device 102 to move accordingly, as described in greater detail herein.

Still referring to FIG. 5, the sensor hardware 380 may generally include one or more hardware components that are used in the cane apparatus 118. Illustrative hardware components that may aid the cane apparatus 118 to transmit a location of a target object 170 toward the robotic device 102 may include, but are not limited to, a camera (including video and still cameras), an optical sensor, a ranging system, a time-of-flight (TOF) sensor, a proximity sensor, laser emitting devices and/or sensing devices. Other sensors, particularly those used for the purposes of obtaining information that is used for facilitating autonomous movement of the robotic device 102, are contemplated and included within the scope of the present disclosure. In some embodiments, the sensor hardware 380 may receive sensed information and transmit signals and/or data corresponding to the sensed information to one or more components described herein. For example, the sensor hardware 380 may capture images and/or image data and generate one or more signals and/or data to transmit to the processing device 340 for processing the data and delivering said data to the robotic device 102. In this instance, the robotic device 102 may process the received data and use the data to maneuver toward the cane apparatus 118 and/or the target object 170, as described in greater detail herein.

The I/O hardware 360 may communicate information between the local interface 300 and one or more other components of the cane apparatus 118. For example, the I/O hardware 360 may act as an interface between the cane apparatus 118 and other components of the lifting robot system 100, so as to facilitate communication between the cane apparatus 118 and the various other components of the robotic device 102, as described in greater detail herein. The I/O hardware 360 may be utilized to transmit one or more commands to the other components of the robotic device 102 and/or receive one or more commands and/or data from the components of the cane apparatus 118 in some embodiments.

The network interface hardware 350 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 350 may be used to facilitate communication between smart home components (e.g., sensors, cameras, user interface devices, and/or the like) and the lifting robot system 100, such as the cane apparatus 118, via a network. That is, the lifting robot system 100 may receive commands from a user, receive sensor data, and/or the like from other devices connected to a user's home network, as described in greater detail herein. The network interface hardware 350 may further be used to facilitate communication between the internal components of the cane apparatus 118 (FIG. 5) and the internal components of the robotic device 102 (FIG. 4).

The data storage component 370, which may generally be a storage medium, may contain one or more data repositories for storing data that is received and/or generated. The data storage component 370 may be any physical storage medium, including, but not limited to, a hard disk drive (HDD), memory, removable storage, and/or the like. While the data storage component 370 is depicted as a local device, it should be understood that the data storage component 370 may be a remote storage device, such as, for example, a server computing device, cloud based storage device, or the like. In some embodiments, illustrative data that may be contained within the data storage component 370 includes, but is not limited to, object data 372, sensor data 374, and/or other data. The object data 372 may generally be data that is used by the cane apparatus 118 to recognize particular target objects 170 (see FIGS. 1A-1C). For example, if a user requests that the lifting robot system 100 lift "keys," the cane apparatus 118 may access the object data 372 to obtain a reference image of a set of keys in order to locate the target object 170 and transmit the object data 372 to the robotic device 102 for retrieval. The object data 372 may be prepopulated data or may be data that is continuously updated with images around a space such that the cane apparatus 118 utilizes a machine learning algorithm to recognize particular characteristics of a target object 170. The sensor data 374 may generally include data that is obtained from the sensor hardware 380. One nonlimiting example of data contained within the sensor data 374 may include image data relating to an area surrounding the cane apparatus 118, a user 150, and/or a target object 170.

It should be understood that the components illustrated in FIG. 5 are merely illustrative and are not intended to limit the scope of this disclosure. More specifically, while the components in FIG. 5 are illustrated as residing within the cane apparatus 118, this is a nonlimiting example. In some embodiments, one or more of the components may reside external to the cane apparatus 118.

Figure 6:
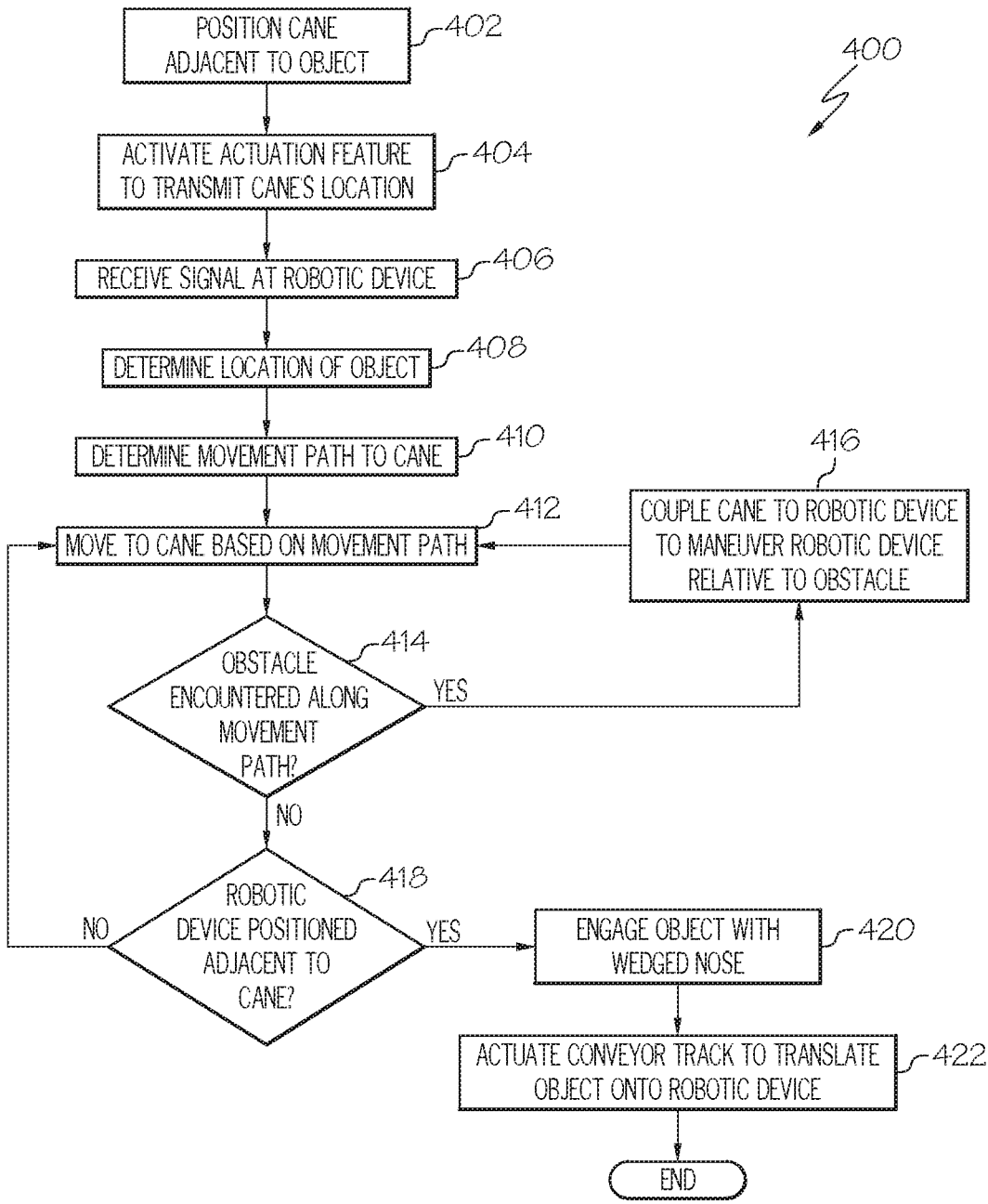
FIG. 6 depicts a flow diagram of an illustrative method of locating and collecting a target object with a lifting robot system according to one or more embodiments shown and described herein.

As mentioned above, the various components described with respect to FIGS. 4-5 may be used to carry out one or more processes and/or provide functionality for moving the robotic device 102 toward the cane apparatus 118, for guiding the robotic device 102 around the terrain 172, for determining an identity and/or a location of a target object 170, for collecting a target object 170, for moving a target object 170, for lifting a target object 170, and/or for receiving inputs by a user 150. An illustrative example of the various processes are described with respect to FIGS. 6-8 below. The various processes described with respect to FIGS. 6-8 may generally be completed by the lifting robot system 100 or a component thereof, such as, for example, the processing device 240 of the robotic device 102 (FIG. 4) and/or the processing device 340 of the cane apparatus 118 (FIG. 5). FIG. 6 depicts an illustrative method of collecting a target object 170 using the lifting robot system 100 of FIGS. 1A-1C according to some embodiments. The various steps described with respect to FIG. 6 are merely illustrative, and additional, fewer, or alternative steps are contemplated without departing from the scope of the present disclosure.

Referring to FIG. 6, while also generally referring to FIGS. 1A-1C, the location of the cane apparatus 118 may be used by the robotic device 102 to determine the location of the target object 170. At block 402, the cane apparatus 118 may be positioned adjacent to a target object 170 that a user 150 desires to retrieve from the terrain 172, as seen in FIG. 1A. Upon the user 150 positioning the cane apparatus 118 in the proximate vicinity of the target object 170, an activation feature of the cane apparatus 118 (e.g., button 126) may be activated by the hand 152 of the user 150, at block 404, to transmit location data of the cane apparatus and/or commands to the robotic device 102 via the corresponding internal components of the cane apparatus 118 and the robotic device 102 described above, respectively. In this instance, the signal of the location of the cane apparatus 118 is transmitted across a network via the network interface hardware 350 until received by the corresponding network interface hardware 250 of the robotic device 102, as seen at block 406 and FIG. 1A. In some embodiments, the cane apparatus 118 may emit ultrasonic transmissions that are detected by receivers positioned within the robotic device 102, whereby the distance between the receivers and the characteristics of the ultrasonic transmissions are used to triangulate the location of the cane apparatus 118. In another example, the cane apparatus 118 and/or the robotic device 102 may utilize ultra-wideband radio emitters and/or receivers to determine the location of the cane apparatus 118. In yet another example, the robotic device 102 may utilize time-of-flight sensors to sense the location of the cane apparatus 118, as described herein.

In response to receiving the location data at block 406, the location of the target object 170 is determined based on the data at block 408. In particular, a location of the target object 170 is generally determined to be relative to the location of a known object, such as the location of the cane apparatus 118. In some embodiments, the location data may include coordinates of the target object 170, as will be described in greater detail below. In that instance, the location of the target object 170 may be determined, for example, by triangulating the location of the cane apparatus 118 and/or the target object 170 by obtaining location information from an image corresponding to the target object 170, by utilizing sensors (e.g., time-of-flight sensors or the like) to locate the target object 170, by sensing a location of the target object 170 projected by the cane apparatus 118, by receiving data voiced or gestured by the user 150 that corresponds to the location (e.g., "by the coffee table," "under the chair," etc.), and/or the like. Upon determining the location of the target object 170 at block 408, a movement path toward the location of the target object 170 and/or the cane apparatus 118 is determined at block 410.

The determination of a movement path of the robotic device 102 toward the cane apparatus 118 and/or the target object 170 may include determining a movement path to the cane apparatus at block 410. For example, a mapping algorithm or the like may be used that accounts for free space and obstruction(s) 174 along the terrain 172 to thereby aid the robotic device 102 in avoiding potential collisions with other obstructions 174 when moving toward the target object 170. In some embodiments, movement may be determined such that the robotic device 102 is correctly positioned relative to the target object 170 (i.e., such that the robotic device 102 is facing the target object 170 and the target object 170 can be moved onto the conveyor track 116, as described above). A signal may be transmitted from the processing device 240 to the drive hardware 230 via the local communications interface 200 to cause the wheels 115 to move the robotic device 102 (e.g., move the robotic device 102 in the +X direction of the coordinate axes of FIG. 1A).

The robotic device 102 (and/or a component thereof) may then move according to the determined movement path at block 412. Robotic device 102 may determine if any obstacles and/or obstructions 174 are along the movement path at block 414. In the event an obstruction 174 is encountered along the movement path, a user 150 may couple the cane apparatus 118 to the robotic device 102 to thereby move, tilt, pivot, and/or maneuver the robotic device 102 about the obstruction 174, at block 416. For example, as seen in FIG. 3, a user 150 may couple the cane apparatus 118 to the robotic device 102 by inserting the tip end 124 of the cane apparatus 118 to the receiver 128 of the robotic device 102 to thereby establish a controlled-connection with the robotic device 102. If not obstructions 174 are encountered along the movement path of the robotic device 102, the robotic device 102 and method 400 may simply proceed to block 418.

In this instance, with an obstruction 174 positioned along the terrain 172 between the robotic device 102 and the target object 170, a user 150 may apply a downward force onto the handle end 122 to thereby tilt the wedged nose 114 of the housing 104 upward relative to the terrain 172. In this instance, the housing 104 of the robotic device 102 is lifted about an angle A such that the wedged nose 114 is positioned relatively above a height of the obstruction 174 on terrain 172. Accordingly, the robotic device 102 may proceed to move along terrain 172 via wheels 115 to thereby drive over the obstruction 174. By way of example only, the obstruction 174 may be a carpet/rug positioned along terrain 172, a mat, tiles, hardwood, a step, and/or the like. It should be understood that the cane apparatus 118 may provide for other relative movements, motions, adjustments, and/or orientation adjustments of the robotic device 102. For example, the cane apparatus 118 may couple to the distal end 103 of the housing 104 to thereby serve as a back-support for the robotic device 102. In this instance, the robotic device 102 may drive over and overcome the obstruction 174 positioned along floor by activating the wheels 115 and pushing off the back-support provided by the presence of the cane apparatus 118 positioned directly behind the distal end 103 of the housing 104.

It should be understood that the processes according to blocks 406, 408, 410, 412 and 414 may occur continuously until the robotic device 102 (and/or a component thereof) is located adjacent to the cane apparatus 118 at block 418, and is thereby positioned relative to the target object 170 for the purposes of collecting the target object 170. As such, at block 418, a determination may be made as to whether the robotic device 102 is adjacent to and correctly positioned relative to the target object 170. Such a determination may generally include obtaining data (e.g., image data and/or the like) and determining the location and positioning of the robotic device 102 relative to the target object 170. If the robotic device 102 is not adjacent to and/or not correctly positioned relative to the target object 170, the process may return to block 412. If the robotic device 102 is adjacent to and correctly positioned relative to the target object 170, as seen in FIG. 1B, the process may proceed to block 420. At block 420, once the wedged nose 114 is positioned and/or oriented to be in alignment with the target object 170, the wedged nose 114 engages the target object 170 for retrieval of the target object 170 onto the robotic device 102.

The housing 104 of the robotic device 102 may be orientated and positioned to align the wedged nose 114 with the target object 170 in response to the user 150 physically adjusting the position and/or orientation of the cane apparatus 118 relative to the robotic device 102 and/or the target object 170 to thereby cause the robotic device 102 to adjust the orientation of the housing 104 relative to the adjusted position of the cane apparatus 118. Alternatively, in other embodiments, a user 150 may actuate a button or other user input feature located on cane apparatus 118 to thereby rotate housing 104 relative to terrain 172 to align wedged nose 114 with the target object 170 located on terrain 172. In other embodiments, the housing 104 may be repositioned about the terrain 172 to align the wedged nose 114 with the target object 170 by physical manipulation caused by the cane apparatus 118.

Once the wedged nose 114 has engaged the target object 170, the process may proceed to block 422. At block 422, the conveyor track 116 may be actuated. Actuation of the conveyor track 116 may include, for example, transmitting an actuation signal from the processing device 340 to the conveyor track control hardware 220 coupled to the conveyor track 116 to activate the conveyor track 116. In this instance, the conveyor track 116 moves to pull or otherwise place the target object 170 onto the conveyor track 116 at the angled surface 112. In the present example, the conveyor track 116 moves along the angled surface 112 and the top surface 106 in the system horizontal direction, as seen in FIGS. 1A-1C. In some embodiments, the conveyor track 116 may become activated upon the initial actuation of the button 126 such that the conveyor track 116 may be simultaneously activated as the cane apparatus 118 transmit the location data of the cane apparatus 118 to the robotic device 102. Alternatively, in other embodiments, a user 150 may actuate a button or other input feature located on cane apparatus 118 to thereby activate the conveyor track 116. In some instances, a user 150 may utilize the tip end 124 of the cane apparatus 118 to push the target object 170 toward the wedged nose 114 to thereby urge the target object 170 up onto the conveyor track 116.

As a result, the target object 170 may be retrieved by the conveyor track 116 at block 422. As seen in FIG. 1C, the conveyor track 116 translates the target object 170 up along the angled surface 112 from a first height at the terrain 172 toward a second height along the top surface 106. In this instance, the conveyor track 116 of the robotic device 102 may generally be used to collect the target object 170 thereon and transport the target object 170, lift the target object 170, and provide the target object 170 to the user 150 at a more accessible height relative to the initial height of the terrain 172. Once the target object 170 has been positioned on the top surface 106, the target object 170 has effectively been lifted to a second height that is accessible to a user 150 for retrieval of the target object 170, at least relative to a first height of terrain 172. In this instance, a user 150 may terminate the translation of conveyor track 116 at a desired moment when the target object 170 is positioned at a desired location along angled surface 112 or top surface 106. For example, a user 150 may actuate a button or other user input feature on cane apparatus 118 to cease movement of the conveyor track 116 and thereby hold the target object 170 at a new, second height relative to the initial, first height of the target object 170 along the terrain 172. In this instance, the second height is higher relative to the first height such that a heightened elevation of the target object 170 facilitates access and retrieval of the target object 170 by the user 150.

It should be understood that the cane apparatus 118 may include additional buttons or user input features to reactivate the conveyor track 116 in a similar or opposite direction. For example, the conveyor track 116 may be reactivated to thereby continue translation in the −X system horizontal direction to further transport the target object 170 along the angled surface 112 and/or the top surface 106 away from the wedged nose 114. In other instances, the conveyor track 116 may be reactivated to commence translation in an opposite, +X system horizontal direction to thereby transport the target object 170 along the angled surface 112 and/or top surface 106 toward the wedged nose 114. For example, a user 150 may desire to release/remove the target object 170 from the robotic device 102 after receiving the target object 170 atop the conveyor track 116 such that the cane apparatus 118 may communicate with the robotic device 102 to "drop" the target object 170 onto terrain 172.

In some embodiments, a user 150 may not be located at or near the target object 170. In addition, a user 150 may not be able to position the cane apparatus 118 in the proximate vicinity of the target object 170. In this example, the cane apparatus 118 may include a sensor device (not shown) mounted on the handle end 122, the tip end 124, and/or the elongated shaft 120. The sensor device may include various components for sensing an environment around the lifting robot system 100 for the purposes of autonomous movement of the robotic device 102, semi-autonomous movement of the robotic device 102, and/or the like. The various components of the sensor array are not limited by the present disclosure, and may generally be any components that provide the functionality described herein. For example, the sensor device may include one or more imaging devices, cameras, optical sensors, ranging systems, time-of-flight (TOF) sensors, proximity sensing systems, laser emitting devices, microphones, ultrasonic signal receivers, and/or the like. Such systems should generally be understood and are not described further herein.

In some embodiments, the sensor device of the cane apparatus 118 may be particularly configured to sense an area adjacent to the cane apparatus 118 and provide data corresponding to the area adjacent to the cane apparatus 118 for transmission to the robotic device 102. The data may then be used to guide the robotic device 102 around a space in an appropriate manner, locate the target object 170 to be lifted, lift the target object 170, navigate to or from one or more other objects (e.g., the user 150), and/or the like, as described in greater detail herein. The area adjacent to the cane apparatus 118 may be, for example, a room in which the robotic device 102 is located, a particular geofenced area that has been defined for the robotic device 102, and/or the like.

It should be understood that in some embodiments, the cane apparatus 118 may not be used for indicating a location of the target object 170. In particular, the cane apparatus 118 may receive an input from a user 150 via another means, and utilize that input to determine the location of the target object 170 or provide data relating to the user's indication. For example, a user 150 may gesture toward the target object 170 (e.g., point at the target object 170 with the cane apparatus 118). The cane apparatus 118, the sensor device stored therein, and/or other components of the cane apparatus 118 may then be used to determine the gesture provided by a user 150, determine the target object 170 based on the gesture (e.g., image an area where the cane apparatus 118 is pointing, etc.), and determine movement or navigation instructions for navigating to the target object 170.

In another example, the user 150 may provide an input (e.g., a voiced input via a microphone include within the cane apparatus 118, a text based input via a keyboard included along a surface of the cane apparatus 118, a joystick input positioned on the handle end 122 of the cane apparatus 118, or the like) that is used to determine the location of the target object 170. For example, the user 150 may verbally say "pick up the keys," "get me the remote from the coffee table," or a similar phrase, and a microphone included on the cane apparatus 118 may sense the input, utilize voice recognition software to recognize the phrase, determine what the target object 170 is based on the recognized phrase, determine the location of the target object 170 (e.g., by determining a location uttered by the user 150, utilizing the sensor device to locate the target object 170, and/or the like), and navigate to the target object 170. Other means of determining where the user 150 is indicating, recognizing the target object 170, and navigating to the target object 170 and/or the cane apparatus 118 are also contemplated and included within the scope of the present disclosure.

In some embodiments, the cane apparatus 118 may be integrated with a third party hardware device and/or software (e.g., via an application programming interface (API) or the like) to interface with the user 150 for the purposes of directing the lifting robot system 100. For example, "smart home" devices such as cameras, microphones, motion sensors, and/or the like that are communicatively coupled to a user's home network may provide data relating to commands received from the user 150, sensed gestures, the location of the target object 170, the location of the robotic device 102 (or a component thereof) relative to the target object 170, and/or the like. In a nonlimiting example, the cane apparatus 118 may incorporate an electronic personal assistant (e.g., Google Assistant (Alphabet, Inc., Mountain View, Calif.), Amazon Alexa® (Amazon.com, Seattle, Wash.), Siri® (Apple, Cupertino, Calif.), Cortana® (Microsoft Corporation, Redmond, Wash.), or the like) to direct the robotic device 102 to pick up the target object 170 (e.g., by voicing a command to the cane apparatus 118 and/or by gesturing toward the target object 170 with the cane apparatus 118).

Figure 7:
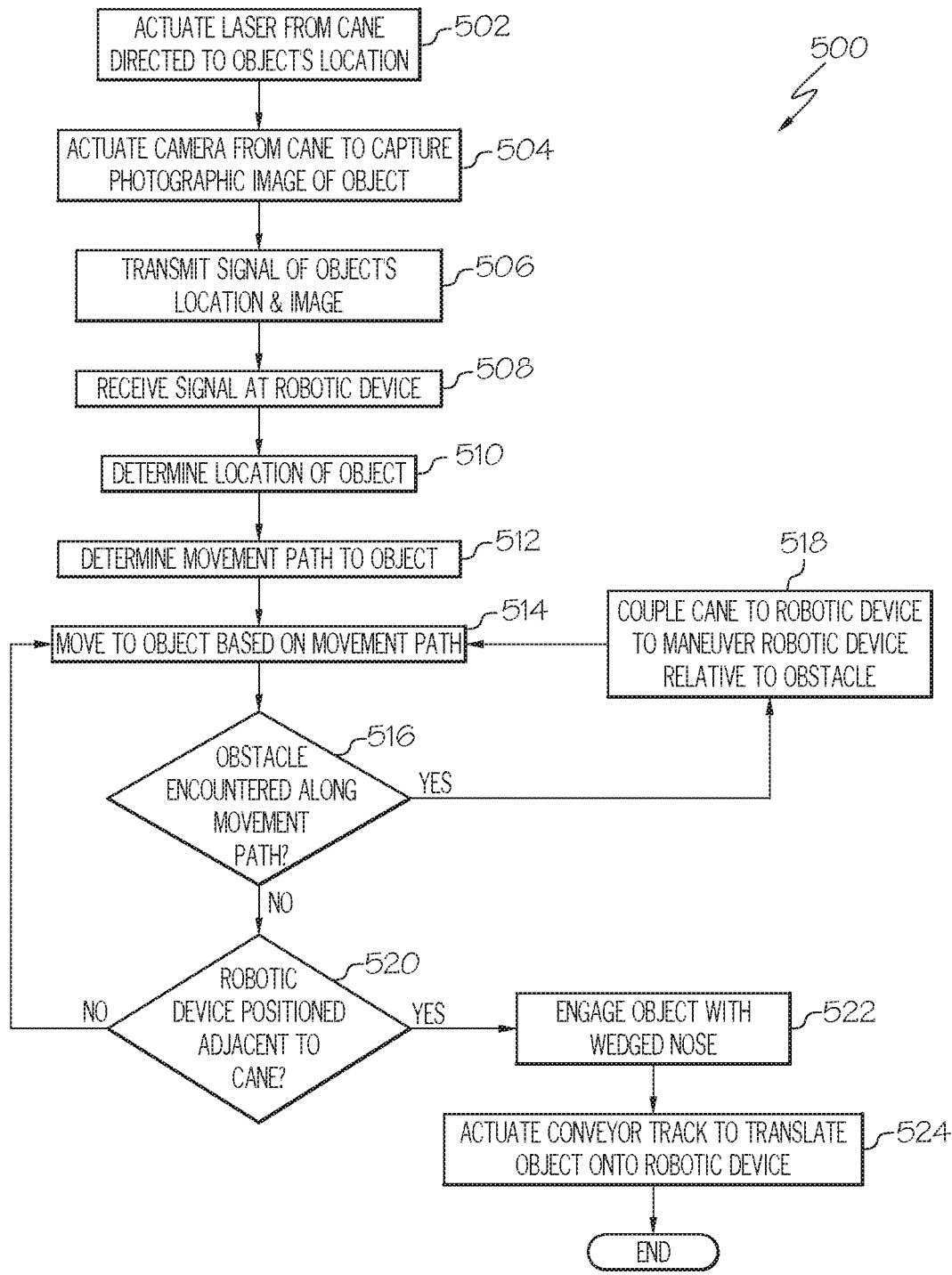
FIG. 7 depicts a flow diagram of another illustrative method of identifying the location of a target object and collecting the object by a lifting robot system according to one or more embodiments shown and described herein.

FIG. 7 depicts an illustrative method of collecting a target object 170, generally designated 500, with the cane apparatus 118 having a light emitting component 127 that emits a beam of light (e.g., a laser beam). The various steps described with respect to FIG. 7 are merely illustrative, and additional, fewer, or alternative steps are contemplated without departing from the scope of the present disclosure. At block 502, the light emitting component 127 of the cane apparatus 118 is actuated and aimed by the user 150 at the target object 170. The light emitted by the light emitting component 127 of the cane apparatus 118 may project a dot on or near the target object 170, a shape around the target object 170, or otherwise provide a projection onto or near the target object 170 that is detected by the sensor device of the cane apparatus 118 and used to generate data relating to the location of the cane apparatus 118 (particularly the tip end 124) relative to the target object 170 such that the robotic device 102 can move relative to the target object 170. The data may include coordinates of the target object 170 that is then used by the robotic device 102 to determine the location of the target object 170. The projection may also be adjusted for size and/or shape by the cane apparatus 118 to correspond to the size and shape of the target object 170 such that a size of the target object 170 can be determined for the purposes of determining whether the target object 170 is small enough to be collected and hoisted by the robotic device 102.

The user 150 may also manipulate the cane apparatus 118 to draw a box around the target object 170 with the light emitting component 127, which is then used for size estimation and determination of whether the target object 170 can be collected and hoisted. In another example, the cane apparatus 118 may be used to determine the location of the target object 170 relative to the cane apparatus 118 and/or the tip end 124 (e.g., via imaging an area for the target object 170, using sound waves to detect the target object 170, using time of flight lasers to detect the target object 170, and/or the like), generate data corresponding to the location, and provide instructions for moving the robotic device 102 relative to the target object 170. In some embodiments, the cane apparatus 118 may include an imaging device (not shown) that is used to capture an image of the target object 170, at block 504. At block 506, the cane apparatus 118 may then transmit location and image data to the robotic device 102, which receives the data at block 508 over a network. The robotic device 102 may then use the data to assist in locating the target object 170 by determining a location of the target object 170 at block 510. Upon determining the location of the target object 170, a movement path to the target object 170 is determined by the robotic device 102 at block 512. In this instance, the robotic device 102 may actuate the wheels 115 to move toward the target object 170 according to the movement path at block 514.

It should be understood that the robotic device 102 may move across the terrain 172 at block 514, detect obstructions 174 along the terrain 172 at block 516, maneuver around the obstructions 174 by coupling with the cane apparatus 118 at block 518, and ultimately determine whether the robotic device 102 is positioned adjacent to the target object 170 at block 520 in a substantially similar process as described above with respect to blocks 412, 414, 416 and 418 of FIG. 6, respectively. Additionally, the robotic device 102 may reposition the wedged nose 114 relative to the target object 170 to engage the target object 170 with the wedged nose 114 at block 522, and actuate the conveyor track 116 to retrieve the target object 170 atop the housing 104 at block 524 in a similar method as described above with respect to blocks 420 and 422 of FIG. 6, respectively. As with blocks 406, 408, 410, 412 and 414 of FIG. 6 described above, it should be understood that the processes according to blocks 508, 510, 512, 514 and 516 may occur continuously until the robotic device 102 (and/or a component thereof) is located adjacent to the target object 170 for the purposes of providing the target object 170 to the user 150 at an accessible height.

Figure 8:
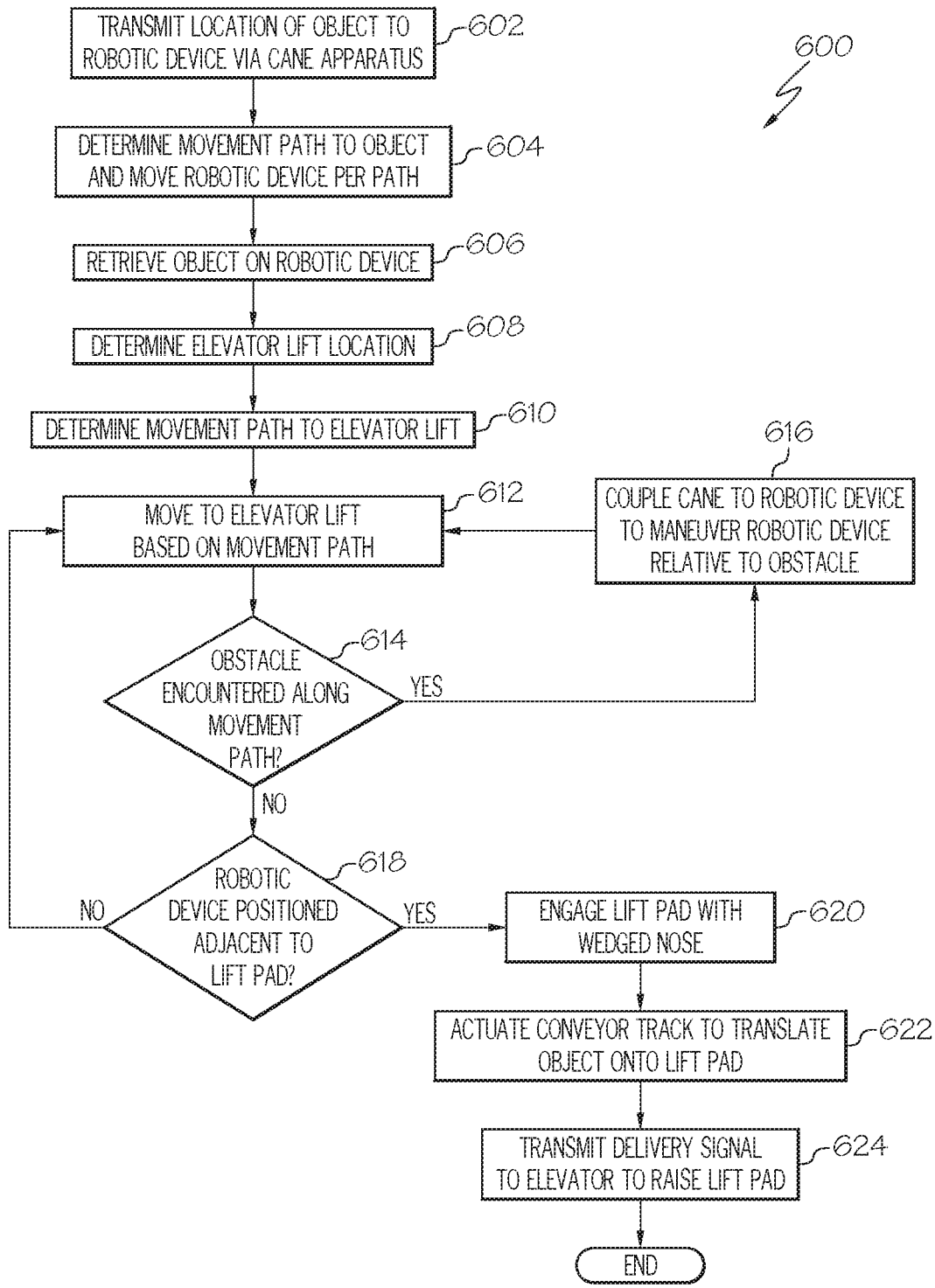
FIG. 8 depicts a flow diagram of another illustrative method of collecting a target object with a lifting robot system and positioning the target object on an elevator system to lift the target object according to one or more embodiments shown and described herein.

FIG. 8 depicts an illustrative method of collecting a target object 170, generally designated 600, using the lifting robot system 100 that includes the robotic device 102, the cane apparatus 118, and a second unit 160 (e.g., an elevator lift, dumbwaiter) as described above according to some embodiments. The various steps described with respect to FIG. 8 are merely illustrative, and additional, fewer, or alternative steps are contemplated without departing from the scope of the present disclosure. In the example method 600 shown in FIG. 8, it should be understood that the steps delineated by blocks 602-606 encompass and are substantially similar to the steps shown and described above at blocks 402-422 of FIG. 6, respectively. Alternatively, it should be understood that in some embodiments the steps delineated by blocks 602-606 encompass and are substantially similar to the steps shown and described by blocks 502-522 of FIG. 7. In either instance, once the target object 170 has been positioned relative to the conveyor track 116 of the robotic device 102, a location of the second unit 160 relative to the robotic device 102 may be determined at block 608. Such a determination may include determining based on the data that is received or the inputs that are received. In some embodiments, the location may include coordinates of the second unit 160. The location of the second unit 160 is then used to determine a movement path of the robotic device 102 (and/or a component thereof) to the second unit 160 at block 610. Such a determination may include use of a mapping algorithm or the like that accounts for free space and obstructions 174 to ensure the robotic device 102 does not collide with other obstructions 174 positioned along terrain 172 when moving toward the second unit 160.

The robotic device 102 (and/or a component thereof) may then move according to the determined movement path at block 612. In the event an obstruction 174 is encountered along the movement path, as seen at block 614, a user 150 may couple the cane apparatus 118 to the robotic device 102 to thereby move, tilt, pivot, and/or maneuver the robotic device 102 about the obstruction 174, as seen at block 616 and as described above and shown in FIG. 3. At block 618, the robotic device 102 is positioned adjacent to the second unit 160 such that the wedged nose 114 of the housing 104 may be repositioned and/or reoriented relative to the lifting pad 164 of the second unit 160. Once the lifting pad 164 and the wedged nose 114 are aligned, the wedged nose 114 may engage the lifting pad 164 of the second unit 160 at block 620. In this instance, the conveyor track 116 may be activated, at block 622, to translate the target object 170 positioned thereon along the top surface 106 and/or the angled surface 112 toward the proximal end 101 until the target object 170 is pushed off the robotic device 102 and onto the lifting pad 164 of the second unit 160. With the target object 170 no longer received atop the robotic device 102, a signal may be transmitted to the second unit 160 at block 624. The signal may generally indicate that the target object 170 is located on the lifting pad 164 and is ready to be lifted to a second height that is easily accessible by a user 150. The signal may be transmitted by a user 150 via the robotic device 102 and/or the cane apparatus 118. In other embodiments, the lifting pad 164 of the second unit 160 may have a sensor detection mechanism positioned therein which may automatically detect the presence of the target object 170 received thereon. In this instance, the second unit 160 may initiate the signal autonomously to thereby raise the lifting pad 164 to the second height.

It should now be understood that the robot systems described herein are configured to autonomously detect and lift objects from a relatively lower height (e.g., ground or floor level) to a relatively higher height (e.g., a height that is more easily reachable by a user) upon receiving a command from the user. The robot systems described herein generally include various components that receive inputs and/or data, sense a surrounding area, autonomously move and locate objects, collect objects, and raise objects. As a result, the robot systems described herein may be particularly useful for elderly users and/or users with reduced mobility, such as users that are unable to easily stoop, crouch, or bend over to pick up an object, users that have arthritis or another condition that makes it difficult to use gripping devices, and/or users that cannot move around a space, such as bedridden users.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A robotic device, comprising:
   a housing defined by proximal and distal ends, and including a top and bottom planar surfaces, and an angled surface extending distally from the proximal end between the bottom planar surface and the top planar surface such that the angled surface forms a wedged nose at the proximal end along the bottom planar surface, the housing further including a receiver shaped and sized to releasably receive a cane apparatus such that the robotic device is movable upon application of a force applied by the cane apparatus on the receiver, wherein the cane apparatus includes one or more input components for selectably actuating the robotic device;

sensor hardware configured to sense an article and transmit data corresponding thereto usable to position the robotic device such that the article is located adjacent to the wedged nose; and a conveyor positioned along the angled surface such that the conveyor transports the article positioned thereon from the proximal end toward the distal end.

2. The robotic device of claim 1, wherein the housing defines a low profile such that the top and bottom planar surfaces include a length greater than a sidewall extending between the top planar surface and the bottom planar surface.

3. The robotic device of claim 1, wherein the conveyor track is further positioned along the top planar surface such that the conveyor track extends continuously from the angled surface to the top surface.

4. The robotic device of claim 1, wherein the robotic device is communicatively coupled to a remote device having a transponder.

5. The robotic device of claim 4, wherein the robotic device receives a location of an article from the transponder of the remote device.

6. The robotic device of claim 1, wherein the wedged nose is sized to receive an article onto the conveyor track.

7. The robotic device of claim 1, wherein the wedged nose extends along a juncture between the angled surface and the bottom planar surface.

8. The robotic device of claim 1, wherein the receiver is positioned along the top surface or a sidewall of the housing at the distal end.

9. The robotic device of claim 1, further comprising a drive mechanism mounted to the housing along the bottom surface such that the drive mechanism moves the housing.

10. A remote controlled robotic system, comprising:
a robotic device, comprising:
a housing having a proximal end and a distal end, the housing is defined by a top surface, a bottom surface, a sidewall, and an angled surface, wherein the top surface extends parallel to the bottom surface and the sidewall extends between the top and bottom surfaces, wherein the angled surface extends transversely relative to the top and bottom surface and forms a wedged nose at a juncture of the angled surface and the bottom surface along the proximal end;
sensor hardware configured to sense an article and transmit data corresponding thereto that is used to position the robotic device such that the article is located adjacent to the wedged nose, the housing further including a receiver; and
a conveyor track positioned along the angled surface that translates from the proximal end at the juncture of the bottom and angled surfaces to the top surface such that the article, when positioned thereon, is translated along the angled surface toward the top surface; and
a cane apparatus communicatively coupled to the robotic device, wherein the receiver is shaped and sized to releasably receive the cane apparatus such that the robotic device is movable upon application of a force applied by the cane apparatus on the receiver, wherein the cane apparatus includes one or more input components for selectably actuating the robotic device.

11. The remote controlled robotic system of claim 10, wherein the housing defines a low profile such that the top and bottom surfaces include a length greater than a height of the sidewall.

12. The remote controlled robotic system of claim 10, wherein the cane includes an actuation feature such that actuation of the actuation feature communicates a location of an article to the robotic device.

13. The remote controlled robotic system of claim 10, wherein the cane includes an actuation feature such that actuation of the actuation feature initiates the conveyor track.

14. The remote controlled robotic system of claim 10, wherein the cane includes an actuation feature such that actuation of the actuation feature communicates a location of an elevator lift to the robotic device.

15. A method for operating a robotic device, the method comprising:
positioning a cane apparatus adjacent to a target object;
moving the robotic device to the cane apparatus such that the robotic device approaches the target object, senses the target object and moves into position to engage the target object with a wedged nose of the robotic device;
actuating a conveyor track of the robotic device to pull the target object up over the wedged nose and onto a top surface of the robotic device; and
when the robotic device is in need of manual adjustment, placing the cane apparatus into a receiver of the robotic device and applying a force to the cane such that the cane applies a force to the robotic device to move the robotic device, wherein the cane apparatus includes one or more input components for selectably actuating the robotic device.

16. The method of claim 15, further comprising transmitting a signal to the robotic device of a location of the cane apparatus upon actuation of a button on the cane apparatus.

17. The method of claim 16, further comprising mapping a movement path to the location of the cane apparatus prior to navigating the robotic device toward the location.

18. The method of claim 15, further comprising transmitting a signal to the robotic device to activate the conveyor track to transfer the target object up the wedged nose upon actuation of a button on the cane apparatus.

* * * * *